US008086441B1

(12) United States Patent
Raffill et al.

(10) Patent No.: US 8,086,441 B1
(45) Date of Patent: Dec. 27, 2011

(54) EFFICIENT STRING SEARCH

(75) Inventors: Thomas E. Raffill, Sunnyvale, CA (US);
Shunhui Zhu, San Jose, CA (US);
Roman Yanovsky, Los Altos, CA (US);
Boris Yanovsky, Saratoga, CA (US);
John Gmuender, San Jose, CA (US)

(73) Assignee: SonicWall, Inc., San Jose, CA (US)

( * ) Notice: Subject to any disclaimer, the term of this patent is extended or adjusted under 35 U.S.C. 154(b) by 1178 days.

(21) Appl. No.: 11/881,556

(22) Filed: Jul. 27, 2007

(51) Int. Cl.
*G06F 17/28* (2006.01)
(52) U.S. Cl. ............... 704/7; 704/10; 707/258; 707/754
(58) Field of Classification Search ............... 704/7, 10; 707/258, 754
See application file for complete search history.

(56) References Cited

U.S. PATENT DOCUMENTS

| | | | | |
|---|---|---|---|---|
| 6,963,837 | B1 * | 11/2005 | Finke et al. | 704/256 |
| 2004/0243408 | A1 * | 12/2004 | Gao et al. | 704/240 |
| 2006/0015326 | A1 * | 1/2006 | Mori et al. | 704/9 |
| 2006/0074630 | A1 * | 4/2006 | Chelba et al. | 704/9 |
| 2008/0066164 | A1 * | 3/2008 | Chebolu et al. | 726/4 |

OTHER PUBLICATIONS

Sproat et al., A Stochastic Finite-State Word-Segmentation Algorithm for Chinese, 1996, Association for Computational Linguistics, pp. 377-404.*
N-Gram, N-Gram—Wikipedia, the free encyclopedia, http://en.wikipedia.org/wiki/Ngram, Apr. 25, 2007, 5 Pages.
SurfControl Web Filtering Solutions, http://www.surfcontrol.com/Print.aspx?id=375&mid=4, Jun. 11, 2007, 6 Pages.
Aho et al., "Efficient String Matching: An Aid to Bibliographic Search", Assocation of Computing Machinery, Inc. 1975, 8 Pages.

* cited by examiner

*Primary Examiner* — Jakieda Jackson
(74) *Attorney, Agent, or Firm* — Blakely, Sokoloff, Taylor & Zafman LLP

(57) ABSTRACT

Some embodiments of an efficient string search have been presented. In one embodiment, a string of bytes representing content written in a non-delimited language is received, wherein the content has been classified into a predetermined category. In a single pass through the string of bytes, a set of N-grams is searched for simultaneously. Statistical information on occurrences of the N-grams, if any, in the string of bytes is collected. In some embodiments, a model is generated based on the statistical information, where the model is usable by a content filter to classify content.

25 Claims, 5 Drawing Sheets

EFFICIENT STRING SEARCH

TECHNICAL FIELD

Embodiments of the present invention relate to classifying content, and more specifically to searching for one or more predetermined N-grams in a string of bytes representing content written in a non-delimited language.

BACKGROUND

Today, many entities (e.g., private companies, government, schools, etc.) rely on various content filtering mechanisms to manage and/or control user access to the Internet via facilities provided by the entities. For example, a company typically implements some form of content filtering mechanism to control the use of the company's computers and/or servers to access contents (e.g., web pages and/or emails) from the Internet. Contents as used herein broadly refer to expressive work, which may include one or more of literary, graphics, audio, and video data. Access to content within certain predetermined categories using the company's computers and/or servers may not be allowed during some predetermined periods of time.

Conventionally, a content rating engine or a content classification engine may be installed in a firewall to screen contents coming into a system from an external network, such as email received and web pages retrieved from the Internet. The content rating engine may retrieve rating of the incoming contents from a rating database, if any, and/or attempt to rate the contents in real-time. To rate the content in real-time, the content rating engine may parse the contents to identify some predetermined keywords and/or tokens and then determine a rating for the contents based on the presence and/or absence of the keywords and/or tokens.

For European languages (e.g., English, French, etc.), the spaces between words are often used as delimiters for recognizing word boundaries. Therefore, words in European languages can be readily tokenized and searched using the spaces between the words. As a result, tokenization generally proceeds efficiently for European languages.

However, the above approach typically fails for languages that lack spaces between words, such as Chinese, Japanese, Thai, etc. Such languages are also referred to as non-delimited languages herein. For example, a Chinese sentence is composed of words, which contain a variable number of characters, with no spaces indicating the word boundaries. Below is an example of an excerpt from a Chinese newspaper:

"在此-星期前，伊朗政府开始实施能源配给制...." The words are 在此(now)—(one) 星期(week) 前(ago) 伊朗(Iranian) 政府(government) 开始(began) 实施(implementing) 能源(energy) 配给制(rationing).... Note that the characters are not separated by spaces, and a word may include one or more characters. Other examples can be more complicated, with ambiguous sentences where the correct split of text into words can be found only by understanding the context. As a result, spaces may not be reliably used as delimiters for recognizing words in Chinese. Because of the above issue, keyword search in non-delimited languages is typically difficult and time consuming. This is particularly problematic in real-time or on-the-fly content filtering because the keyword search has to be limited to avoid causing a noticeable delay in online content access.

BRIEF DESCRIPTION OF THE DRAWINGS

The present invention is illustrated by way of example, and not by way of limitation, in the figures of the accompanying drawings and in which.

DETAILED DESCRIPTION

Figure 1A:
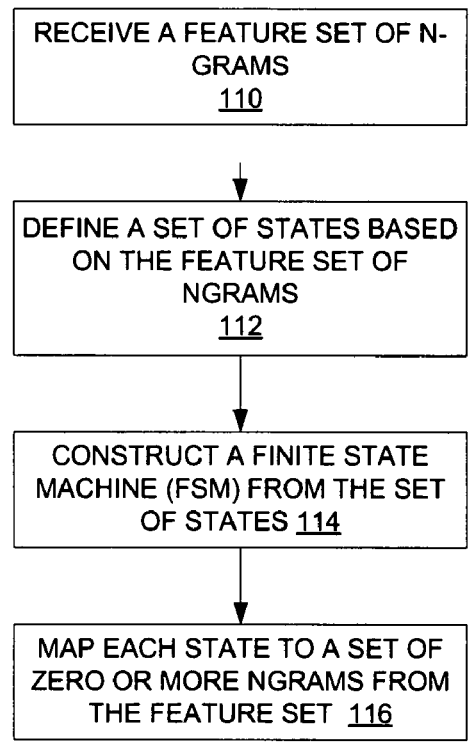
FIG. 1A illustrates one embodiment of a process to construct a finite state machine to search for a set of N-grams in a string of bytes.

Described herein are some embodiments of an efficient string search. As mentioned above, content as used herein broadly refers to expressive work, which may include one or more of literary, graphics, audio, and video data. Online content generally refers to content accessible over a network (e.g., an intranet, the Internet, etc.). Some examples of online content include web pages, electronic mails, etc. Furthermore, content may include text in various formats and/or languages. In general, languages may be categorized as delimited languages and non-delimited languages in the current document. Delimited languages refer to languages composed of words that are separated by spaces, where there is no space within a single word. On the contrary, non-delimited languages refer to languages composed of words, where a word may include zero or more spaces within itself. For example, Chinese is a non-delimited language, where a Chinese sentence is composed of words, which contain a variable number of characters, with no spaces indicating the word boundaries. In order to efficiently search for keywords in a non-delimited language, a set of N-grams representing the keywords are used instead of word tokens. Generally speaking, an N-gram is a sequence of N items, where N is an integer. Each N-gram corresponds to a keyword pre-selected for identifying content of a certain type in a particular non-delimited language.

In some embodiments, a string of bytes representing content written in a non-delimited language is received, wherein the content has been classified into a predetermined category. In a single pass through the string of bytes, a set of N-grams is searched for substantially simultaneously. Statistical information on occurrences of the N-grams, if any, in the string of bytes is collected. The efficient string search disclosed herein may be used in various applications, such as generation of models for document classification, classification of documents during screening of online content, etc. More details of some embodiments of the efficient string search are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Such a medium may also be referred to as a machine-accessible medium.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1A illustrates one embodiment of a process to construct a finite state machine to search for a set of N-grams in a string of bytes. The process may be performed by processing logic that may comprise hardware (e.g., circuitry, dedicated logic, programmable logic, microcode, etc.), software (such as instructions run on a processing device), firmware, or a combination thereof. For example, the server 310 in FIG. 3A may perform at least part of the process in some embodiments.

Referring to FIG. 1A, processing logic receives a set of N-grams (processing block 110). This set of N-grams may also be referred to as a feature set. As mentioned above, an N-gram is a sequence of N items, where N is an integer. Each N-gram corresponds to a keyword pre-selected for identifying content of a certain type in a particular non-delimited language. For instance, a feature set for identifying pornographic content may include keywords that are frequently used in pornographic content. Since the keywords are words in a non-delimited language, there may be zero or more spaces between one or more characters within each keyword. Furthermore, the keywords may include different number of characters. As such, the N-grams within the feature set may be of different lengths (e.g., one byte, two bytes, three bytes, etc.). Note that for large character sets, such as a character set in Chinese, one character is not always one byte. Some popular encodings (e.g., Unicode Transformation Format-8 (UTF-8)) use a variable number of bytes per character. However, the approach disclosed herein handles such scenario smoothly because the approach makes no assumption on the number of bytes in a pattern in the feature set.

Based on the feature set of N-grams, processing logic defines a set of states (processing block 112). In some embodiments, there is one state for every string that can be a prefix of one or more terms in the keyword list. For example, if the feature set of N-grams include "aab", "abb" and "aaabb," where "a" and "b" represent two characters usable to compose different words in a non-delimited language, then there may be states corresponding to "a", "aa", "aab", "ab", "abb", "aaa", "aaab", and "aaabb" (all possible prefixes of each N-gram in the feature set). Note that a single prefix may pertain to more than one keyword, and also note that whole keywords may be considered to be prefixes of themselves. The set of states may be defined by a simple loop over each keyword examining every prefix. In addition, there may be a "start" and an "end" states defined.

Processing logic then constructs a finite state machine (FSM) from the set of states defined (processing block 114). To construct the FSM, processing logic may connect the states to each other as follows. For every state, processing logic reaches the following state by adding an input symbol corresponding to a new prefix, or returns to the start of any new prefix. Continuing with the example above, for a state corresponding to "aa" and an input symbol "a," the next state is the one corresponding to "aaa." If the input symbol is "b" the next state is "aab", or if the input symbol is "c," processing logic returns to the "start" state (since "aac" is not a prefix of any keyword in the feature set). If the end of an input string is reached, processing logic returns to the "end" state of the FSM. In some embodiments, processing logic further construct a transition table for the FSM. To construct the transition table, processing logic may step through every state and every possible input symbol and determine whether the new string is a prefix with a corresponding state. If so, processing logic may transition from the old state to the new state over this input. If not, processing logic may add a transition back to the "start" state. One example of a FSM 130 constructed based on the above exemplary feature set of {"aab", "abb", "aaabb"} is shown in FIG. 1C. Note that the FSM 130 transitions back to the "start" state 1301 from every state in the FSM 130 if the next input is an input other than "a" or "b" (except the "end" state 1309). However, to avoid obscuring the view in FIG. 1C, these transitions back to the "start" state 1301 are not shown.

Referring back to FIG. 1A, processing logic maps each state to a set of zero or more N-grams of the feature set after constructing the FSM (processing block 116). Processing logic may store mappings of the states to the N-grams in an output table. To map the states to the N-grams, processing logic may use the following approach. If the state corresponds to the end of a complete keyword, processing logic may return this keyword. For example, the state "aaab" finishes the complete keyword "aab," so the complete keyword "aab" is outputted. The state "aaabb" finishes the keywords "abb" and "aaabb," so these two keywords are outputted. If a state does not finish any complete keyword, null may be outputted. To construct the output table, processing logic may examine each state and determine whether the corresponding prefix string of the state completes any keywords. If so, processing logic may add these keywords to the output of the state. One example of an output table for the FSM 130 in FIG. 1C is shown below:

TABLE 1

An exemplary output table

| State | N-gram(s) |
|---|---|
| a | Null |
| aa | Null |
| ab | Null |
| aaa | Null |
| aab | aab |
| aaab | aab |
| abb | abb |
| aaabb | abb, aaabb |

Figure 1B:
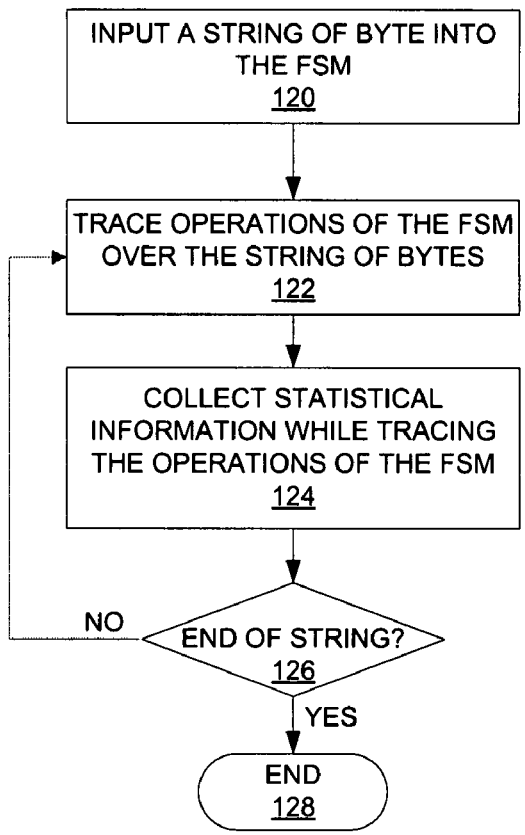
FIG. 1B illustrates one embodiment of a process to search for a set of N-grams in a string of bytes.
Figure 1C:
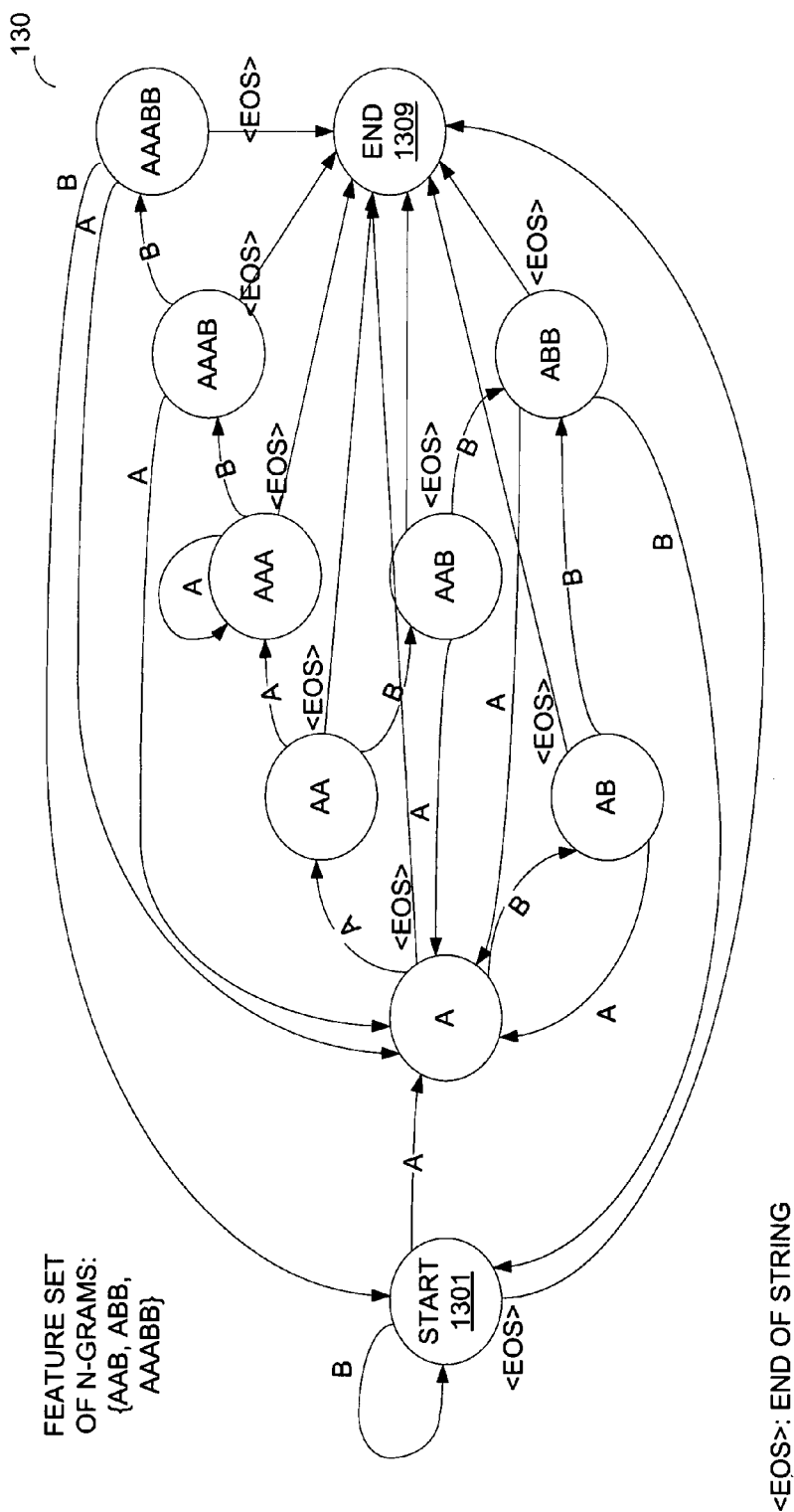
FIG. 1C illustrates an exemplary embodiment of a finite state machine.

FIG. 1B illustrates one embodiment of a process to search for the set of N-grams in a string of bytes using the FSM described above. The process may be performed by processing logic that may comprise hardware (e.g., circuitry, dedicated logic, programmable logic, microcode, etc.), software (such as instructions run on a processing device), firmware, or a combination thereof. For example, the content filter 320 in FIG. 3B may perform at least part of the process in some embodiments.

Referring to FIG. 1B, processing logic inputs a string of bytes into the FSM constructed (processing block 120). The string of bytes represents content written in a non-delimited language, which may be part of a file being downloaded, an electronic mail, a web page, etc. For example, the string of bytes may be at least part of the text on a Japanese web page that a user attempts to access. Then processing logic traces the operations of the FSM over the string of bytes (processing block 122). While tracing the operations of the FSM, processing logic collects statistical information (processing block 124). For example, the statistics may include the number of occurrences of the N-grams, if any, in the string of bytes. In some embodiments, the mappings of the states of the FSM to the corresponding N-grams are stored in an output table, such as Table 1 above. As the FSM transitions into a state that is mapped to one or more N-grams, the FSM outputs the one or more N-grams. Processing logic may keep track of the numbers of occurrences of these N-grams in the string of bytes as the FSM outputs the N-grams.

At processing block 126, processing logic checks whether the end of the string of bytes has been reached. If not, processing logic returns to processing block 122 to continue searching through the string of bytes. Otherwise, the process ends at processing block 128.

The above approach to search for N-grams in the string of bytes is more reliable and efficient than many conventional approaches for non-delimited languages because the above approach does not depend on any delimiters between words. As mentioned above, a non-delimited language may not provide any delimiters between words. Moreover, the above approach simultaneously searches for the N-grams in a single pass through the string of bytes. Thus, this approach remains efficient even for long strings. Such efficient string searching technique has many practical applications, two of which are discussed in details below to illustrate the concept. The first application is model generation and the second application is content classification.

Figure 2A:
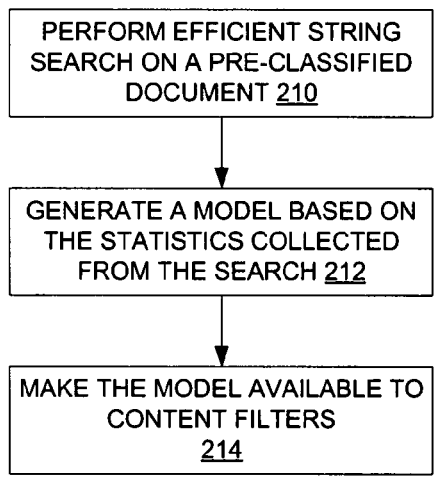
FIG. 2A illustrates one embodiment of a process to generate a model for classifying content.

FIG. 2A illustrates one embodiment of a process to generate a model for classifying content. The process may be performed by processing logic that may comprise hardware (e.g., circuitry, dedicated logic, programmable logic, microcode, etc.), software (such as instructions run on a processing device), firmware, or a combination thereof. For example, the server 310 in FIG. 3A may perform at least part of the process in some embodiments.

In some embodiments, processing logic performs an efficient string search on a pre-classified document to search for a set of N-grams in the document (processing block 210). Some embodiments of the efficient string search have been described above. The pre-classified document may include a web page, an electronic mail message, etc. The content of the pre-classified document has been classified into a certain category (e.g., pornographic content, violent content, etc.). After performing the efficient string search on the document, processing logic generates a model based on the statistical information on the occurrences of the N-grams in the pre-classified document (processing block 212). The model may be made available to content filters (processing block 214). Using the model, the content filters may classify the content of an incoming string of bytes, and then, may determine if access to the content is allowed under some predetermined policies.

Figure 2B:
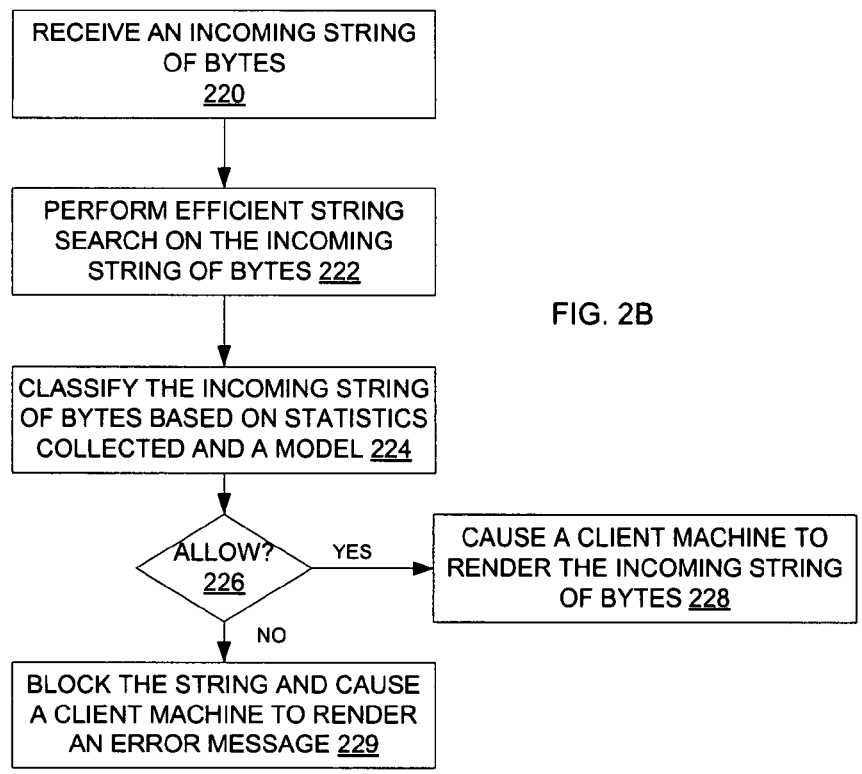
FIG. 2B illustrates one embodiment of a process to classify content.

FIG. 2B illustrates one embodiment of a process to classify content. The process may be performed by processing logic that may comprise hardware (e.g., circuitry, dedicated logic, programmable logic, microcode, etc.), software (such as instructions run on a processing device), firmware, or a combination thereof. For example, the content filter 320 in FIG. 3B may perform at least part of the process in some embodiments.

Referring to FIG. 2B, processing logic receives an incoming string of bytes (processing block 220). The string of bytes may be part of a web page requested by a client, an electronic mail message directed to the client, an article being downloaded from a network in response to a request from the client, etc. Furthermore, the string of bytes represents content written in a non-delimited language. Then processing logic performs an efficient string search on the string of bytes (processing block 222). Some embodiments of the efficient string search have been described above.

While performing the search on the string, statistical information on the occurrences of a set of predetermined N-grams (e.g., the feature set of N-grams discussed above) in the string is collected. Using the statistical information collected and a model (such as the model generated according to FIG. 2A), processing logic classifies the content of the string of bytes (processing block 224). For example, the model may be a model for identifying pornographic content, thus, the model may also be referred to as a pornographic model. The pornographic model may include one or more conditions that have to be satisfied before a string of bytes is classified as pornographic, such as a first N-gram has to occur more than a certain number of times for a string of a certain length, etc. If a predetermined number of conditions in the pornographic model have been satisfied by the statistics of the string, then processing logic may classify the content of the string to be pornographic.

Based on the classification and some predetermined policies, processing logic determines if a user should be allowed to access the string of bytes (processing block 226). For instance, a school may have a policy barring access of pornographic material using school computers. Thus, processing logic may determine to deny access to the string by a user at the school if the content is classified as pornographic.

In some embodiments, processing logic causes a client machine to render the string of bytes if the user is allowed to access the content (processing block 228). For example, processing logic may forward the string of bytes to the client machine, which may execute a network access application (e.g., an Internet browser, an email engine, a document viewing application, etc.) to display the content. Otherwise, if the user is not allowed to access the content, processing logic blocks the string and causes the client machine to render an error message (processing block 229). For example, processing logic may send an error signal to the client machine, which may generate the error message and display the error message via the network access application and/or in a pop-up window.

Figure 3A:
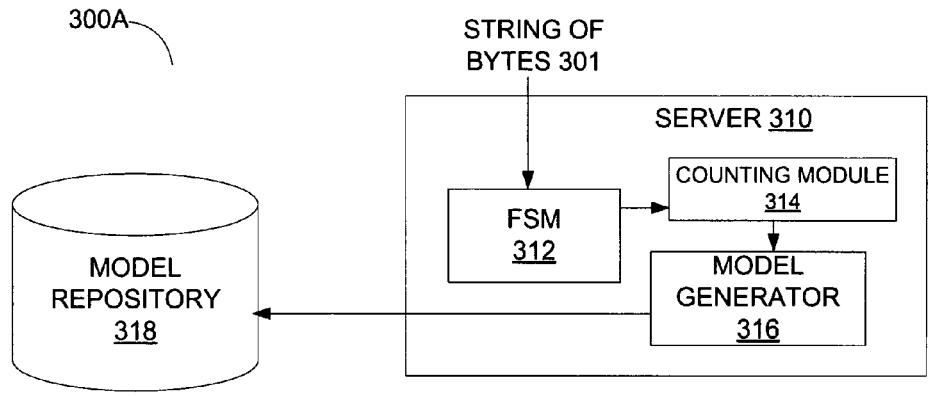
FIG. 3A illustrates a functional block diagram of one embodiment of a system to generate models for classifying content.

FIG. 3A illustrates a functional block diagram of one embodiment of a system to generate models for classifying content. The system 300A includes a server 310 and a model repository 318. The server 310 further includes a finite state machine (FSM) 312, a counting module 314, and a model generator 316. The server 310 may be implemented using a computing machine, such as the one illustrated in FIG. 4. To illustrate the operations of the system 300A, one example is discussed in details below.

In some embodiments, the server 310 receives a set of predetermined N-grams. The N-grams may include bytes representing various keywords in a non-delimited language. Note that the N-grams may be of different lengths. The keywords may be chosen based on their likelihood of occurrences in a particular type of content. For example, keywords, such as "kill," "blood," "gun," etc., are more likely to appear in violent content, and thus, these keywords may be included in the set of N-grams. Based on the set of N-grams, the server 310 defines a set of states and constructs the FSM 312. Details of some embodiments of the definition of states based on the N-grams and the construction of the FSM 312 have been described above.

The server 310 further receives a string of bytes 301 representing a pre-selected document (e.g., a web page, an electronic mail message, etc.) in the non-delimited language. The document has been classified into a particular category (e.g., violent content, pornographic content, etc.). The string of bytes 301 is input to the FSM 312 within the server 310, which performs an efficient string search on the string of bytes 301 to search for the set of N-grams, if any. The FSM 312 simultaneously searches for the set of N-grams through the string of bytes 301 in a single pass. As the FSM 312 goes through the string of bytes 301, the FSM 312 may output the matching N-gram(s) found in the string of bytes 301. Details of some embodiments of the efficient string search performed by the FSM 312 have been discussed above.

The output from the FSM 312 is provided to the counting module 314, which counts the number of occurrences of each of the N-grams in the string of bytes 301. Then the counting module 314 sends the numbers of occurrences of the N-grams to the model generator 316. The model generator 316 uses the numbers of occurrences of the N-grams to generate a model for classifying content. The model may be stored in the model repository 318, which may be accessible by content filter clients across a network (e.g., an intranet, the Internet, etc.). Alternatively, the model may be transferred or downloaded to content filter clients, which store the model in storage devices (e.g., ROM, RAM, etc.) within the content filter clients. More details on classifying content using the model are discussed below.

Figure 3B:
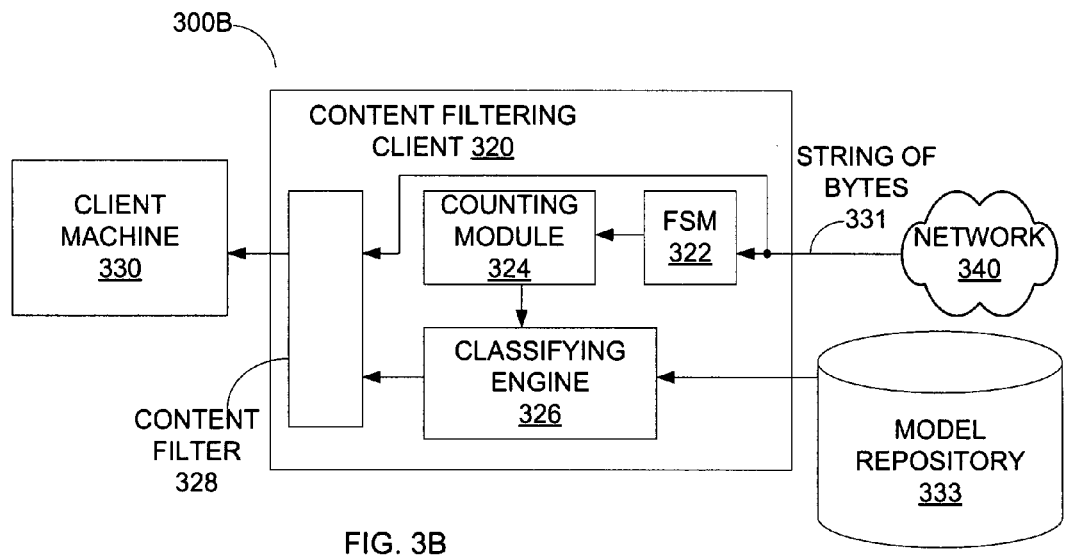
FIG. 3B illustrates a functional block diagram of one embodiment of a system to classify content.

FIG. 3B illustrates a functional block diagram of one embodiment of a system to classify content. The system 300B includes a content filtering client 320, a client machine 330, a model repository 333, and a network 340. The network 340 and the model repository 318 are coupled to the content filtering client 320. The content filtering client 320 is further coupled to the client machine 330. In some embodiments, the content filtering client 320 acts as a firewall between the client machine 330 and the network 340. Alternatively, the content filtering client 320 acts as a spam filter for the client machine 330 to screen out electronic mail messages classified as spam. The client machine 330 may include a computing machine, such as a desktop personal computer (PC), a laptop PC, a personal digital assistant (PDA), a mobile telephone, the computing machine illustrated in FIG. 4, etc. A network access application (e.g., a browser, an electronic mail engine, etc.) may be executed on the client machine 330. The network 340 may include one or more kinds of network, such as an intranet, the Internet, etc. In the current example, the model repository 333 is directly coupled to the content filtering client 320. Alternatively, the model repository 333 may be indirectly coupled to the content filtering client 320 via the network 340.

In some embodiments, the content filtering client 320 may be implemented in a set-top box having components, such as, for example, a processor, network interface, one or more storage devices (e.g., RAM, ROM, flash memory, etc.), etc. Alternatively, the content filtering client 320 may be implemented on a proxy server (also referred to as a gateway server). A functional block diagram of the content filtering client 320 is illustrated in FIG. 3B.

Referring to FIG. 3B, the content filtering client 320 includes a FSM 322, a counting module 324, a classifying engine 326, and a content filter 328. The content filtering client 320 receives a string of bytes 331 from the network 340. The string of bytes 331 is forwarded to both the content filter 328 and the FSM 322. The FSM 322 may include states defined based on a set of N-grams as discussed above. The string of bytes 331 may represent content written in a non-delimited language (e.g., a web page, an electronic mail message, etc.). Then the FSM 322 performs an efficient string search on the string of bytes 331 to look for the N-grams. Details of some embodiments of the efficient string search have been discussed above. As the FSM 322 searches through the string of bytes 331, the FSM 322 may output N-gram(s) found in the string of bytes 331. Based on the output from the FSM 322, the counting module 324 collects statistics on the occurrences of the N-grams in the string of bytes 331. For instance, the counting module 324 may count the numbers of occurrences of the N-grams in the string of bytes 331. The counting module 324 then provides the numbers of occurrences of the N-grams to the classifying engine 326. The classifying engine 326 further receives a model from the model repository 333.

In some embodiments, the classifying engine 326 compares the statistical information collected against the model in order to classify the content represented by the string of bytes 331. Details of some embodiments of content classification have been discussed above. After classifying the content, the classifying engine 326 notifies the content filter 328 of the classification of the content. The content filter 328 then decides whether to allow the string 331 to pass through or to block the string 331 based on the classification.

For example, the client machine 330 may be a laptop computer provided by a company to its employee, and thus, the client machine 330 is not allowed to access pornographic materials under company policy. If the classifying engine 326 classifies the string of bytes 331 to be pornographic, then the content filter 328 may block the string of bytes 331 from the client machine 330. Further, the content filter 328 may take additional courses of action, such as generating an error message to inform the user of the client machine 330 that access to the content represented by the string of bytes 331 is denied, reporting the attempted access to a system administrator, recording information of the attempted access (e.g., time of access, user logged into the client machine 330, source of the string 331, etc.).

On the other hand, if the classifying engine 326 classifies the string of bytes 331 to be non-pornographic, the content filter 328 may allow access to the content and forward the string 331 to the client machine 330.

In another example, the classifying engine 326 classifies the string of bytes 331 to be spam and the user has previously requested to block all spam. Then the content filter 328 may block the string of bytes 331 from the client machine 330.

In some embodiments, the client machine 330 may render the content represented by the string of bytes 331 if the string of bytes 331 is forwarded from the content filtering client 320. For example, the client machine 330 may include a display device and an application (e.g., a browser, a document viewing application, etc.) executable on the client machine 330 may render the content via the display device. Otherwise, the client machine 330 may render the error message from the content filter 328 if access to the string 331 is denied because of the classification of the content.

Figure 4:
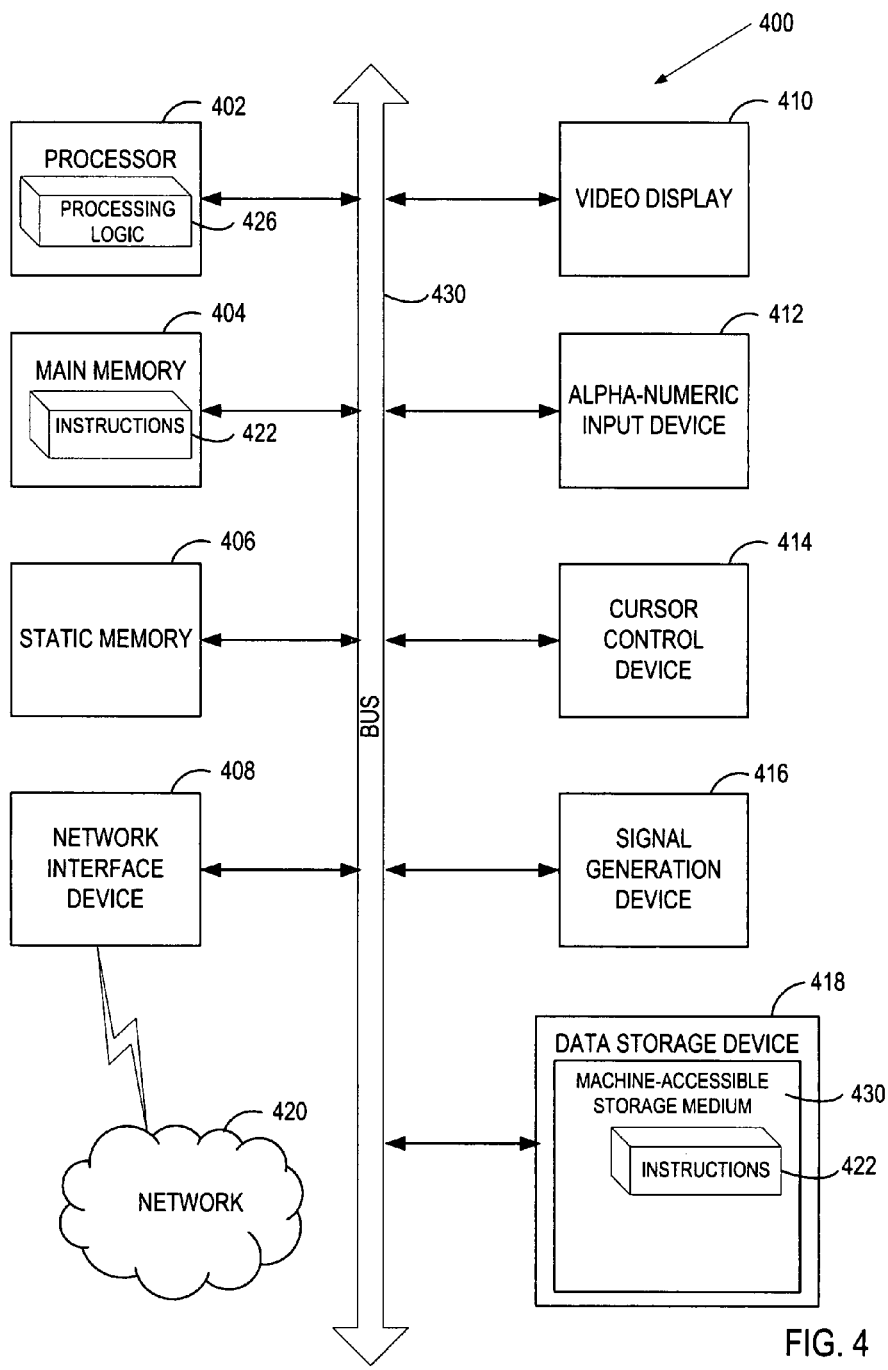
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of an efficient string search have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
  receiving, by a processor, a string of bytes representing non-segmented text written in a non-delimited language, wherein the non-segmented text has been classified into a predetermined category;
  simultaneously searching, by the processor, for a plurality of N-grams in a single pass through the string of bytes;
  collecting, by the processor, statistical information on occurrences of the plurality of N-grams in the string of bytes;
  generating, by the processor, a model based on the statistical information, the model usable by a content filter to classify contents;
  defining, by the processor, a plurality of states based on the plurality of N-grams;

constructing, by the processor, a finite state machine having the plurality of states, wherein the plurality of states are coupled to each other via one or more paths; and mapping, by the processor, each of the plurality of states to a set of zero or more of the plurality of N-grams in an output table.

2. The method of claim 1, wherein collecting the statistical information comprises:

counting, by the processor, a number of occurrences of each of the plurality of N-grams in the string of bytes.

3. The method of claim 1, wherein simultaneously searching the plurality of N-grams in the string of bytes further comprises:

inputting, by the processor, the string of bytes into the finite state machine; and tracing, by the processor, operations of the finite state machine over the string of bytes.

4. The method of claim 3, wherein collecting the statistical information comprises:

counting, by the processor, a number of occurrences of each of the N-grams using the output table while tracing the operations of the finite state machine.

5. The method of claim 1, wherein the non-delimited language is Chinese.

6. A computer-implemented method comprising:

receiving, by a processor, a string of bytes representing non-segmented text written in a non-delimited language;

simultaneously searching, by the processor, for a plurality of N-grams in a single pass through the string of bytes;

collecting, by the processor, statistical information on occurrences of the plurality of N-grams in the string of bytes;

classifying, by the processor, the non-segmented text based on the statistical information;

blocking, by the processor, the non-segmented text if the non-segmented text is classified to be in a prohibited category;

causing, by the processor, a network access application to render the non-segmented text if the non-segmented text is content to be in an allowable category;

defining, by the processor, a plurality of states based on the plurality of N-grams;

constructing, by the processor, a finite state machine having the plurality of states, wherein the plurality of states are coupled to each other via one or more paths; and mapping, by the processor, each of the plurality of states to a set of zero or more of the plurality of N-grams in an output table.

7. The method of claim 6, wherein classifying the non-segmented text based on the statistical information comprises:

comparing, by the processor, the statistical information against a model generated from a previously classified document.

8. The method of claim 6, wherein simultaneously searching for the plurality of N-grams in the string of bytes further comprises:

inputting, by the processor, the string of bytes into the finite state machine; and tracing, by the processor, operations of the finite state machine over the string of bytes.

9. The method of claim 8, wherein collecting the statistical information comprises:

counting, by the processor, a number of occurrences of each of the N-grams using the output table while tracing the operations of the finite state machine.

10. The method of claim 6, wherein the non-delimited language is Japanese.

11. A non-transitory machine-accessible medium that provides instructions that, if executed by a processor, will cause the processor to perform operations comprising:

receiving a string of bytes representing non-segmented text written in a non-delimited language, wherein the non-segmented text has been classified into a predetermined category;

simultaneously searching for a plurality of N-grams in a single pass through the string of bytes;

collecting statistical information on occurrences of the plurality of N-grams in the string of bytes;

generating a model based on the statistical information, the model usable by a content filter to classify contents, defining a plurality of states based on the plurality of N-grams;

constructing a finite state machine having the plurality of states, wherein the plurality of states are coupled to each other via one or more paths; and mapping each of the plurality of states to a set of zero or more of the plurality of N-grams in an output table.

12. The non-transitory machine-accessible medium of claim 11, wherein collecting the statistical information comprises:

counting a number of occurrences of each of the plurality of N-grams in the string of bytes.

13. The non-transitory machine-accessible medium of claim 11, wherein simultaneously searching for the plurality of N-grams in the string of bytes further comprises:

inputting the string of bytes into the finite state machine; and tracing operations of the finite state machine over the string of bytes.

14. The non-transitory machine-accessible medium of claim 13, wherein collecting the statistical information comprises:

counting a number of occurrences of each of the N-grams using the output table while tracing the operations of the finite state machine.

15. A non-transitory machine-accessible medium that provides instructions that, if executed by a processor, will cause the processor to perform operations comprising:

receiving a string of bytes representing non-segmented text written in a non-delimited language;

simultaneously searching for a plurality of N-grams in a single pass through the incoming string of bytes;

collecting statistical information on occurrences of the plurality of N-grams in the string of bytes;

classifying the non-segmented text based on the statistical information;

blocking the non-segmented text if the non-segmented text is classified to be in a prohibited category;

causing a network access application to render the non-segmented text if the non-segmented text is classified to be in an allowable category;

defining a plurality of states based on the plurality of N-grams constructing a finite state machine having the plurality of states, wherein the plurality of states are coupled to each other via one or more paths; and mapping each of the plurality of states to a set of zero or more of the plurality of N-grams in an output table.

16. The non-transitory machine-accessible medium of claim 15, wherein classifying the non-segmented text based on the statistical information comprises:
comparing the statistical information against a model generated from a previously classified document.

17. The non-transitory machine-accessible medium of claim 15, wherein simultaneously searching for the plurality of N-grams in the string of bytes further comprises:
inputting the string of bytes into the finite state machine; and
tracing operations of the finite state machine over the string of bytes.

18. The non-transitory machine-accessible medium of claim 17, wherein collecting the statistical information comprises:
counting a number of occurrences of each of the N-grams using the output table while tracing the operations of the finite state machine.

19. An apparatus comprising:
a finite state machine having a plurality of states logically coupled to each other via one or more paths, the plurality of states being mapped to a plurality of N-grams in an output table, wherein the finite state machine is operable to simultaneously search for the plurality of N-grams through a string of bytes in a single pass, wherein the string of bytes represents non-segmented text written in a non-delimited language;
a counting module coupled to the finite state machine to count a number of occurrences of each of the plurality of N-grams in the string of bytes while tracing operations of the finite state machine over the string of bytes; and
a model generator coupled to the counting module to generate a model based on the number of occurrences of each of the plurality of N-grams, the model usable by a content filter to classify contents.

20. The apparatus of claim 19, further comprising:
a repository coupled to the model generator to store the model.

21. An apparatus comprising:
a finite state machine having a plurality of states logically coupled to each other via one or more paths, the plurality of states being mapped to a plurality of N-grams in an output table, wherein the finite state machine is operable to simultaneously search for the plurality of N-grams through a string of bytes in a single pass, wherein the string of bytes represents non-segmented text written in a non-delimited language;
a counting module coupled to the finite state machine to count a number of occurrences of each of the plurality of N-grams in the string of bytes while tracing operations of the finite state machine over the string of bytes; and
a classifying engine coupled to the counting module to classify the non-segmented text based on the number of occurrences of each of the plurality of N-grams, to block the string of bytes and to generate an error message if the non-segmented text is classified to be in a prohibited category, and to cause a display device to render the non-segmented text if the non-segmented text is classified to be in an allowable category.

22. The apparatus of claim 21, wherein the classifying engine is operable to compare the number of occurrences of each of the plurality of N-grams against corresponding information in a first model to determine if the non-segmented text is likely to be within the prohibited category.

23. The apparatus of claim 21, wherein the classifying engine is operable to compare the number of occurrences of each of the plurality of N-grams against corresponding information in a second model to determine if the non-segmented text is likely to be within the allowable category.

24. A system comprising the apparatus of claim 21, further comprising:
a client machine coupled to the apparatus, wherein the client machine comprises the display device.

25. The system of claim 24, further comprising:
a repository coupled to the apparatus, to store one or more models for classifying contents.

* * * * *